United States Patent [19]

Leung

[11] Patent Number: 5,829,042
[45] Date of Patent: Oct. 27, 1998

[54] PREFETCH OPERATION FOR NETWORK PERIPHERAL DEVICE HAVING SHARED MEMORY

[75] Inventor: Samuel C. Leung, Roseville, Calif.

[73] Assignee: Hewlett-Packard Company, Palo Alto, Calif.

[21] Appl. No.: 601,909

[22] Filed: Feb. 15, 1996

[51] Int. Cl.[6] .................................................. G06F 12/00
[52] U.S. Cl. ..................... 711/147; 711/137; 711/151; 711/167
[58] Field of Search .................. 395/872, 200.2, 395/250, 842, 879, 861, 800; 711/147, 137

[56] References Cited

U.S. PATENT DOCUMENTS

| | | | |
|---|---|---|---|
| 4,535,404 | 8/1985 | Shenk ........................................ | 395/879 |
| 4,583,163 | 4/1986 | Kobayashi et al. ...................... | 395/250 |
| 5,101,477 | 3/1992 | Casper et al. ............................ | 395/250 |
| 5,299,313 | 3/1994 | Petersen et al. ...................... | 395/200.2 |
| 5,301,279 | 4/1994 | Riley et al. .............................. | 395/861 |
| 5,307,459 | 4/1994 | Petersen et al. ........................ | 395/200 |
| 5,392,412 | 2/1995 | McKenna ................................ | 395/872 |
| 5,412,782 | 5/1995 | Hausman et al. ....................... | 395/250 |
| 5,434,872 | 7/1995 | Petersen et al. ........................ | 371/57.1 |
| 5,485,584 | 1/1996 | Hausman et al. ........................ | 395/842 |
| 5,507,005 | 4/1996 | Kojima et al. ........................... | 395/872 |
| 5,546,543 | 8/1996 | Yang et al. ............................... | 395/250 |
| 5,574,939 | 11/1996 | Keckler et al. .......................... | 395/800 |

Primary Examiner—Tod R. Swann
Assistant Examiner—Fred Fei Tzeng

[57] ABSTRACT

A prefetch operation greatly reduces the amount of delay between the transmission of a peripheral device request and the receipt of an I/O card acknowledge for peripheral read data, for example in a network printer environment where the amount of time required to transfer print data from an I/O card to a printer is reduced which, in turn, reduces the amount of time required for the printer to process a print job. The communication protocol between a peripheral device and an I/O card is typically based on a packet data structure, which consists of a header that contains the starting address of the buffer, the data length, and maximum data length of the packet buffer fields which are used for the information transfer between the I/O card and peripheral device; and a buffer for transferring data or messages between the peripheral device and the I/O card. The prefetch operation reduces the possibility of shared memory contention by prefetching the next requested data. The next data request is predictable because the packet resides sequentially in the shared memory. The prefetch operation also reduces memory access time for a peripheral device read request when the data are available from a prefetch buffer, such that the access time for a peripheral device read request from the prefetch buffer is relatively short compared to a read request from the shared memory.

44 Claims, 3 Drawing Sheets

PREFETCH OPERATION FOR NETWORK PERIPHERAL DEVICE HAVING SHARED MEMORY

BACKGROUND OF THE INVENTION

1. Technical Field

The invention relates to computer networks. More particularly, the invention relates to a shared memory scheme for a computer having an I/O function that interfaces the computer network to a peripheral device.

2. Description of the Prior Art

The modular I/O ("MIO") interface is an interface between a peripheral device, such as a printer, and a computer I/O card. MIO was developed by Hewlett-Packard Company of Palo Alto, Calif. (see, for example J. Wendt et al, U.S. Pat. No. 5,197,128).

The peripheral device and the I/O card communicate via a shared memory that is typically located on the I/O card. A memory arbitrator located on the I/O card manages allocation of the shared memory between the peripheral device and the I/O card. When both the I/O card and the peripheral device simultaneously access the shared memory, the I/O card memory arbitrator delays access for one of the requesters until memory is available.

Various approaches have been proposed for accelerating such data transfer. For example, R. Hausman, P. Sherer, J. Rivers, C. Zikmund, G. Connery, N. Strohl, R. Reid, Programmed I/O Ethernet Adapter With Early Interrupts For Accelerating Data Transfer, U.S. Pat. No. 5,412,782 (2 May 1995) discloses an Ethernet adapter for a local area network system that exchanges data with a host through programmed I/O and FIFO buffers. The programmed I/O employs a DMA ring buffer backup to allow incoming packets to be copied directly into a host memory when the programmed I/O buffer is full. The adapter may be programmed to generate early receive interrupts when only a portion of a packet has been received from the network, thereby decreasing latency. The adapter may also be programmed to generate a second early interrupt to allow copying of a large packet the host to overlap reception of the packet end. The adapter may also be programmed to begin packet transmission before the packet is completely transferred from the host to the adapter, thereby further reducing latency.

B. Petersen, D. Brown, W. P. Sherer, Apparatus For Automatic Initiation Of Data Transmission, U.S. Pat. No. 5,434,872 (18 Jul. 1995) discloses a system for early initiation of transmission of data in a network interface that includes a dedicated transmit buffer and logic for transferring frames of data composed by the host computer into the transmit buffer. The amount of data of a frame which is downloaded by the host to the transmit buffer is monitored to make a threshold determination of an amount of data of the frame resident in the transmit data buffer. The network interface controller includes logic for initiating transmission of the frame when the threshold determination indicates that a sufficient portion of the frame is resident in the transmit buffer, and prior to transfer of all the data of the frame into the transmit buffer. The monitoring logic includes a threshold store that is programmable by the host computer to store a threshold value set by the host system to optimize performance in a given setting.

B. Petersen, W. P. Sherer, D. Brown, L.-C. Lo, Network Adapter With Host Indication Optimization, U.S. Pat. No. 5,307,459 (26 Apr. 1994) discloses a network adapter that reduces host processor interrupt latency by providing optimized indication signals for a completed data frame transfer. The network adapter includes network interface logic for transferring the data frame between the network and a buffer, and host interface logic for transferring the data frame between the buffer memory and the host system. The network adapter also includes threshold logic that compares a threshold value stored in an alterable storage location with a data transfer counter to thereby generate an early indication signal. The early indication signal is used to generate an early interrupt signal which is sent to a host processor before the transfer of a data frame is completed.

FIG. 1 is a block schematic diagram of a prior art shared memory scheme for a computer that includes an I/O card which provides an interface to a peripheral device. As shown in FIG. 1, the peripheral device 10 interfaces directly to the I/O card 12a shared memory arbitrator 13a, e.g. via the MIO interface 11a, in known I/O card designs, which typically include an I/O card CPU 15a and an I/O card LAN controller 16a. This arrangement requires the I/O card memory arbitrator to arbitrate the shared memory 14a for every peripheral request, which creates contention in the shared memory. Therefore, the amount of delay from the transmission of a peripheral request to the receipt of an I/O card acknowledge, i.e. the amount of time that is required for the peripheral device to read or write data to the I/O shared memory, can vary greatly due to need for simultaneous access to the shared memory by both the peripheral device and the I/O card.

The minimum amount of delay from a peripheral read request to an I/O card acknowledge is determined by the amount of time required for a shared memory access without memory contention. Thus, it would be desirable to provide an I/O card design that either eliminates or mitigates such contention, and that thereby reduces the amount of delay between the transmission of a peripheral device request and the receipt of an I/O card acknowledge for peripheral read and/or write data.

SUMMARY OF THE INVENTION

The invention provides a prefetch operation, for example in a network peripheral device that implements a data transfer protocol such as the MIO protocol developed by Hewlett-Packard Company of Palo Alto, Calif. The prefetch operation greatly reduces the amount of delay between the transmission of a peripheral device request and the receipt of an I/O card acknowledge for peripheral read data. While the invention herein is discussed in connection with the presently preferred embodiment which includes the MIO protocol, it will be appreciated by those skilled in the art that the invention is readily applicable to other data transfer protocols.

A prefetch operation does not typically reduce the amount of delay between the transmission of a peripheral device request to the receipt of an I/O card acknowledge for peripheral write data. However, in most environments, e.g. network printers, the I/O card receives print data from the network and transfers the print data to the printer via the I/O card interface. As a result, the majority of peripheral requests are read requests rather than write requests. Thus, one aspect of the invention exploits to advantage the fact that a reduction in delay for read requests produces a disproportionate improvement in overall system performance One benefit of a prefetch operation herein disclosed in a network printer environment is that the amount of time required to transfer the print data from the I/O card to the printer is reduced which, in turn, reduces the amount of time required for the printer to process a print job.

The communication protocol between a peripheral device and an I/O card is typically based on a packet data structure, which consists of a header and a buffer. The packet header contains the starting address of the buffer, the data length, and maximum data length of the packet buffer fields which are used for the information transfer between the I/O card and peripheral device. The data length field of the packet header indicates the number of bytes of valid buffer data. The packet buffer is used for transferring data or messages between the peripheral device and the I/O card. The packet is allocated by the I/O card software. The memory address block of the packet is sequential, starting at a low address and progressing to a high address.

The data transfer rate between the peripheral device and the I/O card is determined by the amount of delay between the transmission of the peripheral request and the receipt of the I/O card acknowledge of the shared memory access. For example, if the peripheral device is a printer or plotter, the majority of packets are data packets. By reducing the delay of the peripheral device request to the I/O card acknowledge time, the printer data transfer rate is increased.

In prior art schemes, the peripheral device reads each byte of packet data through the shared memory with each memory access. If the peripheral device memory access contends with the I/O card memory access, the amount of delay between the peripheral device request and I/O card acknowledge time increases, and the data transfer rate therefore decreases.

The prefetch operation herein disclosed reduces the possibility of shared memory contention by prefetching the next requested data. The next data request is predictable because the packet resides sequentially in the shared memory. In addition to reducing shared memory contention, the prefetch operation herein disclosed reduces memory access time for a peripheral device read request when the data are available from a prefetch buffer. The access time for a peripheral device read request from the prefetch buffer is relatively short compared to a read request from the shared memory.

The herein disclosed prefetch technique provides a hardware enhancement, typically in an I/O card, that increases the read data transfer rate from an I/O card to a peripheral device through the I/O card interface. In an environment where the peripheral device is a printing device, such as a laser printer or inkjet plotter, the increased read data transfer rate translates to faster processing of the print job by the I/O card and the printing device.

DETAILED DESCRIPTION OF THE INVENTION

The prefetch technique herein described provides a hardware enhancement in an I/O card that reduces the amount of delay between the transmission of a peripheral device read request and the receipt of an I/O card acknowledge of the request. Although described herein in connection with the preferred embodiment as an MIO data prefetch technique for a network printer, the prefetch technique is compatible with any peripheral device using any appropriate I/O protocol.

Figure 1:
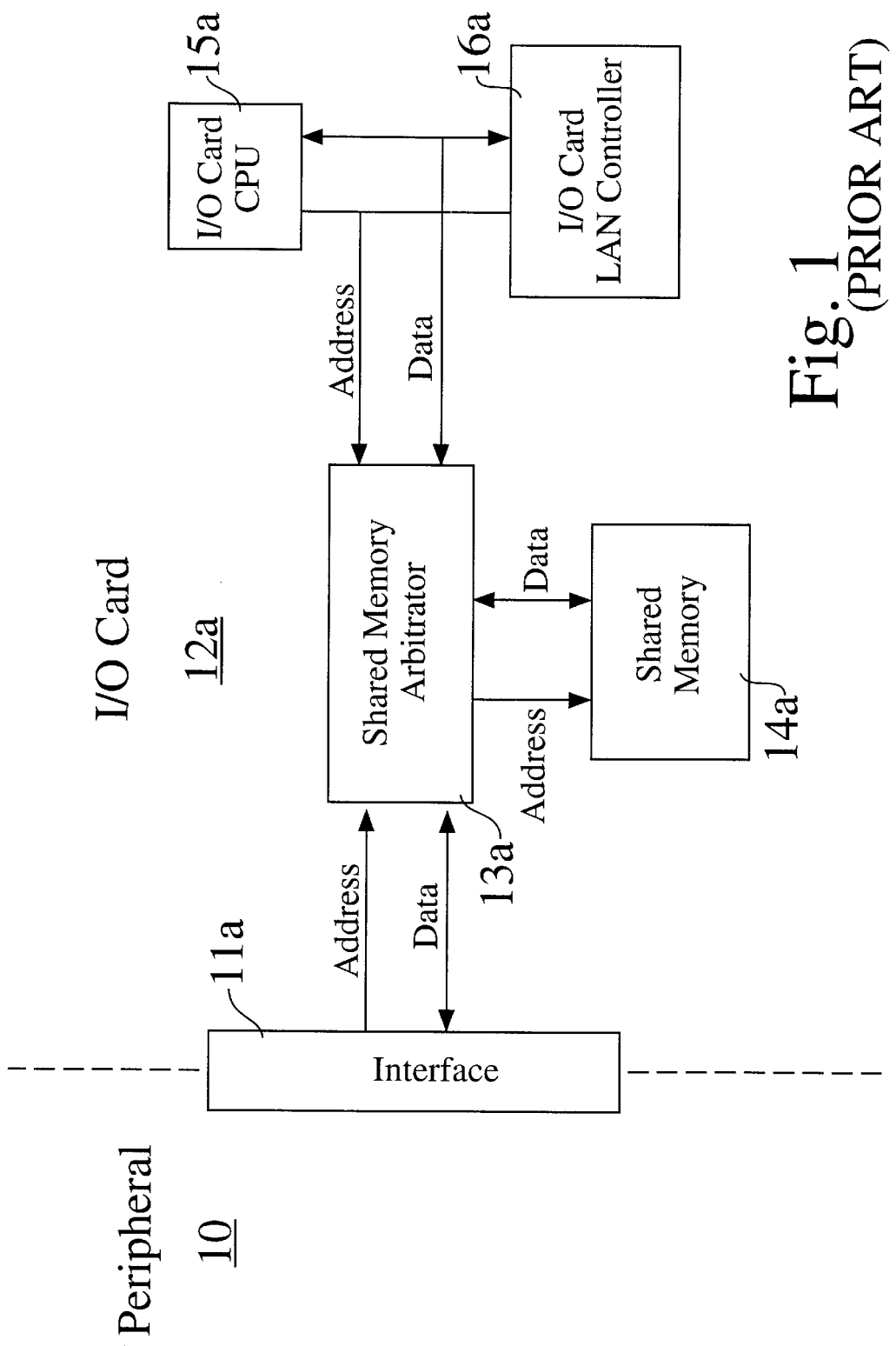
FIG. 1 is a block schematic diagram of a prior art shared memory scheme for a computer that includes an I/O card which provides an interface to a peripheral device.
Figure 2:
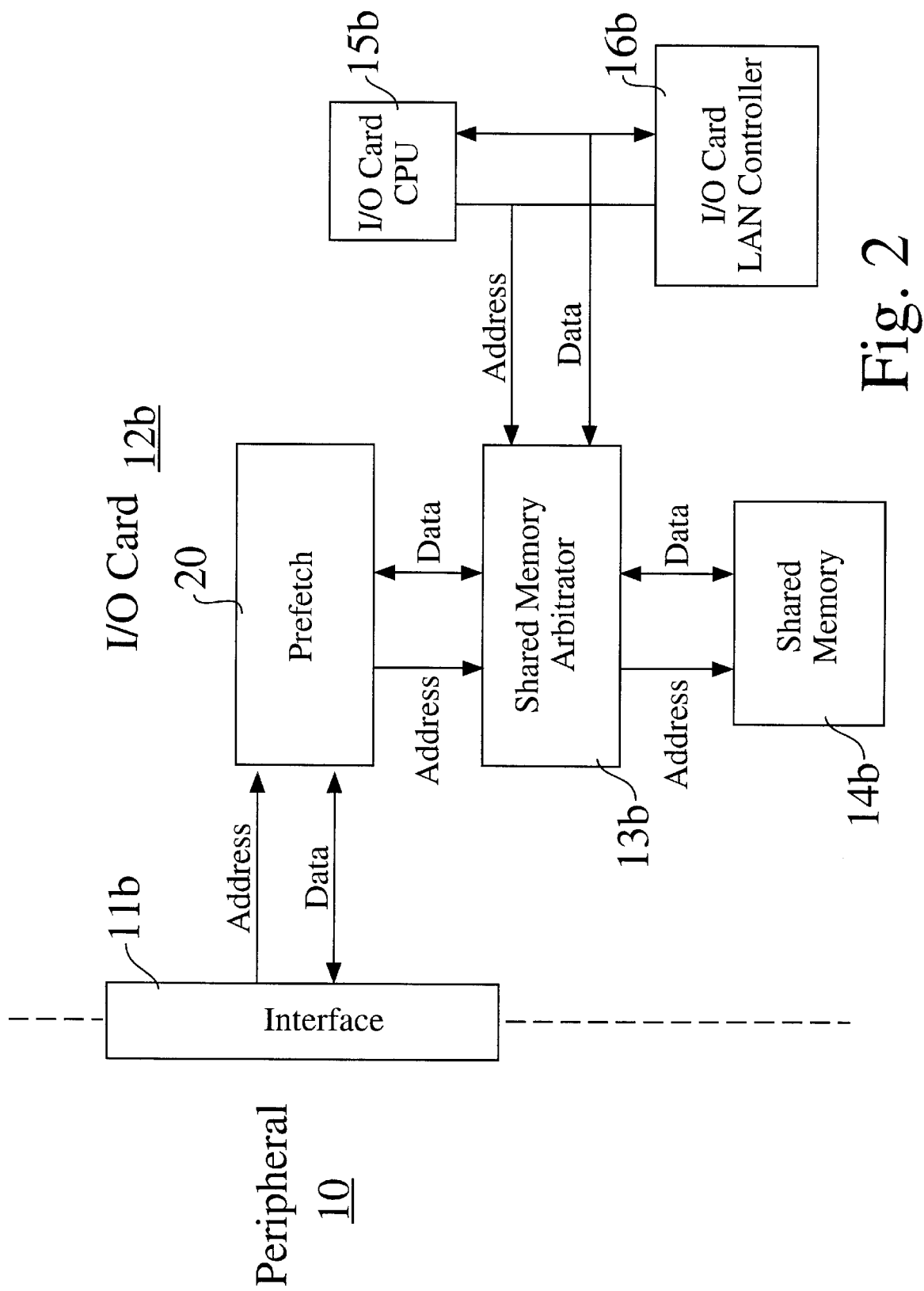
FIG. 2 is a block schematic diagram of an I/O card that implements a prefetch technique for a shared memory scheme according to the invention.

FIG. 2 is a block schematic diagram of an I/O card that implements a prefetch technique for a shared memory scheme according to the invention. As is shown in FIG. 2, a prefetch module 20 is located between the peripheral device interface 11b and a shared memory arbitrator 13b. A dynamic random access memory (DRAM) array having a page mode may be used as the I/O card shared memory 14b in connection with the herein disclosed prefetch technique to enhance the performance of the prefetch operation by reducing shared memory contention.

Figure 3:
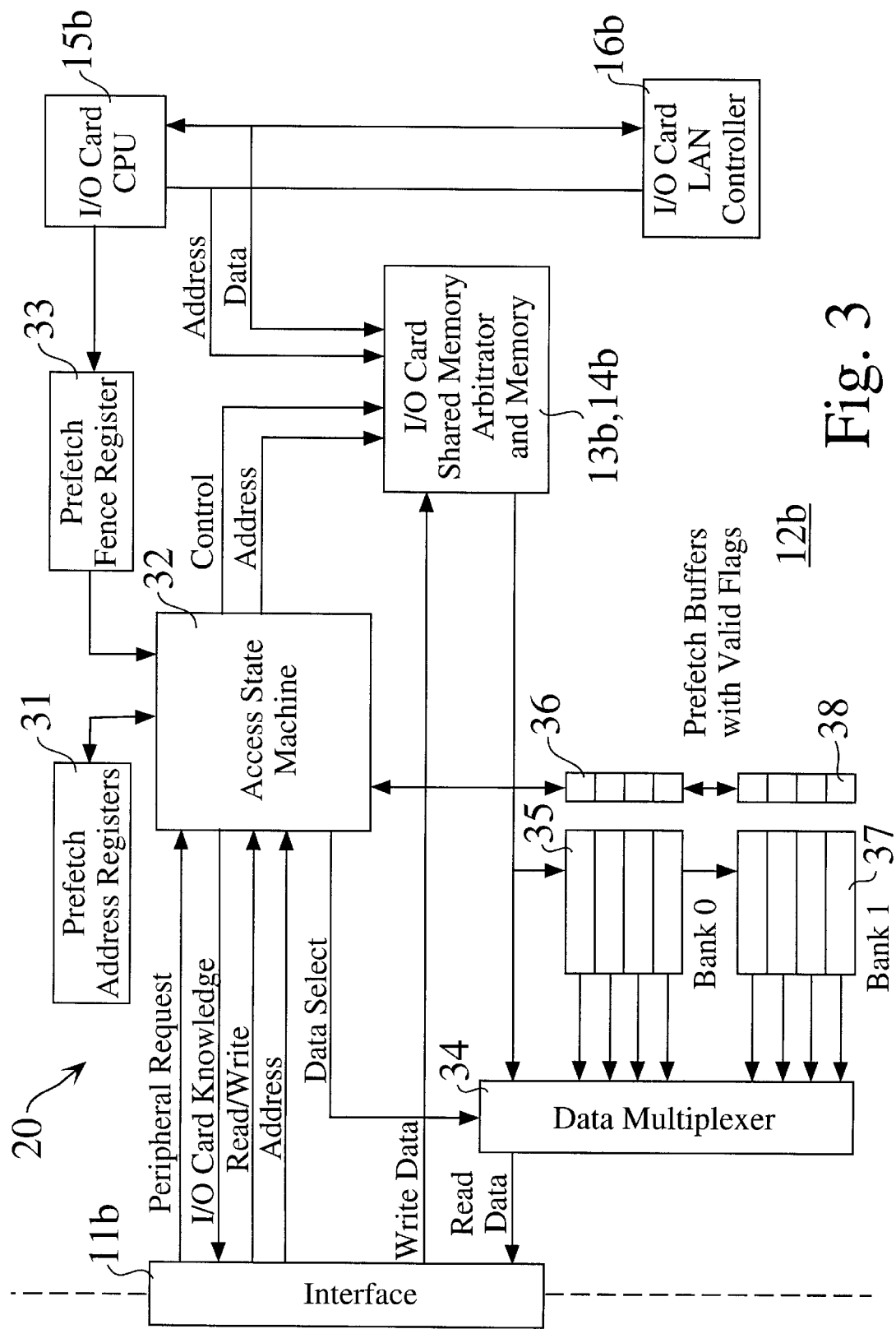
FIG. 3 is a detailed block schematic diagram of the I/O card that implements the prefetch technique for the shared memory scheme of FIG. 2 according to the invention.

FIG. 3 is a detailed block schematic diagram of the I/O card that implements the prefetch technique for a shared memory scheme of FIG. 2 according to the invention. As shown in FIG. 3, there are four major components of the prefetch module 20:

1. Access State Machine 32;
2. Prefetch Address Registers 31;
3. Prefetch buffers with valid flags 35,36,37,38; and
4. Prefetch fence register 33.

Access State Machine

The Access State Machine 32 (ASM) is responsible for processing all peripheral device shared memory requests. The ASM may use any of three modes to access the shared memory, ie. byte write, byte read, and long word read. Each of the three modes is described below.

If the shared memory request is a write request, then the ASM requests a single byte write to the shared memory 14b from shared memory arbitrator 13b and the ASM asserts an I/O card acknowledge.

When the shared memory request is a read operation, and the requested shared memory address is below the Prefetch Address Fence Register (PAFR) 33, the ASM requests single byte read from the shared memory arbitrator. If the requested shared memory address is above PAFR and the word align address does not match either Prefetch Address Register 0 (PAR0) or Prefetch Address Register 1 (PAR1) (collectively identified on FIG. 3 by the numeric designator 31), then the ASM requests a single long word read from the shared memory arbitrator with the starting address equal to the concatenation of the most significant 14 bits of the requested address and 2 bits of 0 (i.e. the single long word read request address is the word aligned). As each byte of data is read from the shared memory during the single long word read request, it is stored in the appropriate Bank 0 or Bank 1 prefetch buffer, which is identified on FIG. 3 by the numeric designators 35 or 37, respectively. Additionally, the ASM validates each prefetch buffer 36, 38 as it is stored in the buffer. When the peripheral request data is available from a valid prefetch buffer, the ASM asserts an I/O card acknowledge.

The ASM 32 also requests a single long word read from the shared memory arbitrator 13b when the peripheral device read request is read from the third byte of either Bank 0 (35) or Bank 1 (37) of the prefetch buffers 36, 38. In this case, the ASM invalidates the bank of prefetch buffers that does not contain the peripheral request data. The ASM generates a starting address equal to the current peripheral address+2 (i.e. the next word aligned peripheral address) for the single long word read request to the shared memory arbitrator. As each byte of data is read from the shared memory, the ASM validates the buffers.

To simplify the implementation of the prefetch technique herein described, it is not necessary to provide data coherency hardware, as with a cache. Rather, the prefetch operation may be implemented in such way that the peripheral device is protected from reading stale data.

First, the prefetch operation protects the peripheral device from reading stale data from the I/O mailboxes by use of the prefetch fence register 33 (discussed in greater detail elsewhere herein).

Second, during a peripheral device write request, data is written directly to the shared memory, and the bank of prefetch buffers is invalidated if the most significant 14 bits of the peripheral address matches either PAR0 or PAR1.

Third, to protect the peripheral device from reading incorrect packet header data, the ASM invalidates both banks of prefetch buffers when the peripheral device reads the least significant byte of the peripheral device mailbox packet pointer. In the preferred embodiment of the invention, the peripheral device must read the peripheral device mailbox packet pointer to get the starting address of the packet. The prefetch algorithm, discussed below, provides a detailed description of the ASM.

Prefetch Address Registers

The Prefetch Address Registers consist of PAR0 and PAR1. Each register is 14. bits wide. The ASM writes to PAR0 or PAR1 with the most significant 14 bits of the Single Long Word read request address during a prefetch operation.

Prefetch Buffers with Valid Flags

The prefetch buffers consist of two banks of 4-byte buffers 35, 37, designated as bank 0 and bank 1. Each byte of a buffer contains a flag that indicates if the data byte is valid. The first byte of bank 0 contains data for the word aligned peripheral address (i.e. PAR0+0), the second byte of bank 0 contains data for the word aligned peripheral address plus one (i.e. PAR0+1), the third byte of bank 0 contains data for the word aligned peripheral address plus two (i.e. PAR0+2), and the fourth byte of bank 0 contains data for the word aligned peripheral address plus three (i.e. PAR0+3). This same scheme holds true for bank 1, except that the word aligned peripheral address PAR1 is used instead of PAR0.

Prefetch Address Fence Register

In the preferred embodiment of the invention, the prefetch address fence register (PAFR) 33 is an I/O card programmable register that is 16 bits wide. This register represents the shared memory address+1 where a prefetch operation begins. Therefore, any peripheral device read request having a shared memory address greater than the PAFR is prefetched. This register is also used by the ASM to disable a prefetch operation. The I/O card disables a prefetch operation by writing FFFFH to the PAFR register. Because the prefetch implementation does not handle data coherency between shared memory and the prefetch buffers, the I/O mailboxes (shared memory addresses 0000H through 0007H) should not be enabled for prefetching. The I/O card must write to the PAFR with an address greater than or equal to 0007H to disable prefetching of the I/O mailboxes.

Dynamic Random Access Memories with Page Mode

The optional use of dynamic random access memories (DRAM) with page mode as the shared memory improves the performance of the prefetch operation. DRAMs that provide a page mode of operation include a feature that allows high speed random access of memory cells within the same row. Additionally, using one memory access for four bytes of read data reduces shared memory contention between the I/O card and a peripheral device as compared to a prior art I/O card.

Prefetch Algorithm

A portion of the prefetch algorithm for an MIO implementation of the invention is presented below in pseudo code format:

```
if (MIO read request and (MIO_ADDR>MPFR)) then
begin
    if ((MIO_ADDR[15:2] = MPAR0[13:0]) and (Bank 0
    Buffer[MIO_ADDR[1:0]] Flag Valid) then
    begin
        1)  Read data from Prefetch Bank 0 buffer[MIO_ADDR[1:0]]
            and acknowledge request.
        2)  if (MIO_ADDR[1:0] = 2) then read 4 bytes into bank 1
            buffers with starting address of MIO address+2;.
    end
    else if ((MIO_ADDR[15:2] = MPAR1[13:0]) and (Bank 1
    Buffer[MIO_ADDR[1:0]] Flag Valid)
        then
    begin
        1)  Read data from Prefetch Bank 1 buffer[MIO_ADDR[1:0]]
            and acknowledge request.
        2)  if (MIO_ADDR[1:0] = 2) then read 4 bytes into bank 0
            buffers with starting address of MIO address+2.
    end
    else begin
        1)  Read 4 bytes of data starting from concatenate address of
            MIO_ADDR[15:2] and 0 into last unused bank of buffers.
        2)  When requested read data is valid in prefetch buffer then
            acknowledge request.
    end
end
else begin.
    if (MIO read request) then
    begin
        1)  Read byte data from shared memory and acknowledge
            request.
        2)  if (MIO_ADDR=address of the Peripheral mailbox packet
            pointer least significant byte) then invalidate Bank 0 and
            Bank 1 buffers.
    end
    else/*write request*/
    begin
        1)  Write byte data to shared memory and acknowledge
            request.
        2)  if (MIO_ADDR[15:2] = MPAR0) then invalidate Bank 0
            buffers.
        3)  if (MIO_ADDR[15:2] = MPAR1) then invalidate Bank 1
            buffers.
    end
end
```

Comparison Of Peripheral Read Delay Between I/O Card With And Without Prefetch

An analysis of the peripheral device read delay without a prefetch operation is presented below This example uses a packet buffer data of eight bytes with the starting address of the packet buffer long word aligned (i.e. the least significant two bits of the starting address are 00).

The assumptions are:

1. The delay from the transmission of the peripheral device read request to the receipt of the I/O card acknowledge without shared memory contention is 1T.

2. The delay with contention is 2T 3. 50% of the peripheral device read contends with that of the I/O card.

The table below illustrates the sequence and the delays associated with each peripheral read request.

TABLE 1

Peripheral read request without prefetch

| Sequence Number | Peripheral | I/O Card W/O Prefetch | Delay |
|---|---|---|---|
| 1 | Request Byte 0 | Read from shared memory then acknowledge. | 1T |
| 2 | Request Byte 1 | Read from shared memory then acknowledge. | 2T |
| 3 | Request Byte 2 | Read from shared memory then acknowledge. | 1T |
| 4 | Request Byte 3 | Read from shared memory then acknowledge. | 2T |
| 5 | Request Byte 4 | Read from shared memory then acknowledge. | 1T |
| 6 | Request Byte 5 | Read from shared memory then acknowledge. | 2T |
| 7 | Request Byte 6 | Read from shared memory then acknowledge. | 1T |
| 8 | Request Byte 7 | Read from shared memory then acknowledge. | 2T |

As shown in Table 1, the total delay to read eight bytes from the packet buffer requires 12T, which yields an average delay per byte read of 1.5T.

The following is an analysis of the delays with the same configuration and assumptions as above, but where the I/O card includes a prefetch operation. This example assumes that the starting address of the packet buffer is above the prefetch fence register, that the prefetch hardware is configured with two banks of prefetch buffers, and that the shared memory is implemented with page mode DRAMs.

Furthermore, to simplify the delay calculations, it is assumed that the delay of reading four bytes from shared memory is less then the time for the peripheral device to read two bytes from the I/O card. This assumption is valid because the shared memory is implemented with page mode DRAMs and a prefetch state machine always read four bytes (i.e. a long word read) from shared memory when the prefetch function is enabled. For comparison purposes, it is assumed that the amount of delay from the transmission of a peripheral device read request to the receipt of I/O card acknowledge is 50% of the normal delay T when the requested data is available from the prefetch buffers.

TABLE 2

Peripheral read request with prefetch

| Sequence Number | Peripheral | I/O Card With Prefetch | Delay |
|---|---|---|---|
| 1 | Request Byte 0 | Read 4 bytes from shared memory into Bank 0 Prefetch buffers. When byte is available in byte 1 buffer of bank 0 then acknowledge. | 1T (because requested byte is first byte read) |
| 2 | Request Byte 1 | Read byte from Prefetch byte 2 buffer of Bank 0 then acknowledge. | 0.5T |
| 3 | Request Byte 2 | Read byte from byte 3 buffer of Bank 0 then acknowledge. Additionally, read next 4 bytes from shared memory into Bank 1 Prefetch buffers. | 0.5T |
| 4 | Request Byte 3 | Read byte from Prefetch byte 4 buffer of Bank 0 then acknowledge. | 0.5T |
| 5 | Request Byte 4 | Read byte from Prefetch byte 1 buffer of Bank 1 then acknowledge. | 0.5T |
| 6 | Request Byte 5 | Read byte from Prefetch byte 2 buffer of Bank 1 then acknowledge. | 0.5T |
| 7 | Request Byte 6 | Read byte from byte 3 buffer of bank 0 then acknowledge. Additionally, read next 4 bytes from shared memory into Bank 0 Prefetch buffers. | 0.5T |
| 8 | Request Byte 7 | Read byte from Prefetch byte 4 buffer of Bank 0 then acknowledge. | 0.5T |

Table 2 shows that the total delay to read an eight byte packet buffer with an prefetch operation is 4.5T. This yields an average delay per byte read of 0.561T, which results in a 280% improvement from a read where no prefetch operation is used. It is clear that the improvement of the amount of delay from the transmission of a peripheral device request to the receipt of an I/O card acknowledge would be much greater with larger packet buffers.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. An apparatus for reducing shared memory contention at an interface between a peripheral device and a computer network, the interface implementing a data transfer protocol such that packet data is linearly transmitted via said interface to said shared memory, and the control mechanism for said packet resides in a predefined location in a shared memory, the apparatus comprising:

a shared memory;

a shared memory arbitrator; and a prefetch module located between said peripheral device and said shared memory arbitrator, said prefetch module prefetching the next requested data in a read operation on said packet data, said prefetch module further comprising:

an access state machine for processing peripheral device shared memory requests;

at least one prefetch address register;

at least one prefetch buffer with at least one valid flag; and a prefetch fence register.

2. The apparatus of claim 1, said shared memory further comprising:

a page mode dynamic random access memory (DRAM) array.

3. The apparatus of claim 1, wherein said access state machine may use any of a byte write, byte read, and long word read mode to access said shared memory.

4. The apparatus of claim 1, wherein said access state machine requests a single byte write to said shared memory from shared memory arbitrator, and said access state machine asserts an acknowledge if said shared memory request is a write request.

5. The apparatus of claim 1, wherein said access state machine requests a single byte read from said shared memory arbitrator if said shared memory request is a read operation, and a requested shared memory address is below a prefetch address fence register.

6. The apparatus of claim 1, wherein said access state machine requests a single long word read from said shared memory arbitrator if the requested shared memory address is above a prefetch address fence register and said memory address, word aligned, does not match either a prefetch address register 0 (PAR0) or a prefetch address register 1 (PAR1).

7. The apparatus of claim 6, wherein each byte of data is stored in a bank 0 or bank 1 prefetch buffer as it is read from said shared memory during a single long word read request.

8. The apparatus of claim 7, wherein said access state machine requests a single long word read from said shared memory arbitrator if a peripheral device read request is read from a third byte of either bank 0 or bank 1 of said prefetch buffer, wherein said access state machine invalidates a bank of said prefetch buffers that does not contain peripheral request data.

9. The apparatus of claim 8, wherein said access state machine generates a starting address equal to a current peripheral address plus a next word aligned peripheral address for a single long word read request to said shared memory arbitrator.

10. The apparatus of claim 9, wherein said access state machine validates said prefetch buffer as each byte of data is read from said shared memory.

11. The apparatus of claim 6, wherein data is written directly to said shared memory, and a bank of said prefetch buffer is invalidated if a peripheral address, word aligned, matches either prefetch address register PAR0 or PAR1 during a peripheral device write request.

12. The apparatus of claim 6, wherein said prefetch address register consists of prefetch address registers PAR0 and PAR1; and wherein said access state machine writes to prefetch address registers PAR0 or PAR1 with the most significant bits of a single long word read request address during a prefetch operation.

13. The apparatus of claim 1, wherein said access state machine validates said prefetch buffer as each byte of data read from said shared memory is stored in said prefetch buffer.

14. The apparatus of claim 1, wherein said access state machine asserts an acknowledge when peripheral request data is available from a valid prefetch buffer.

15. The apparatus of claim 1, wherein a peripheral device is protected from reading stale data from an I/O mailbox by use of said prefetch fence register.

16. The apparatus of claim 1, wherein said access state machine invalidates both banks of said prefetch buffer when a peripheral device reads a least significant byte of a peripheral device mailbox packet pointer, wherein said peripheral device is protected from reading incorrect packet header data.

17. The apparatus of claim 16, wherein said peripheral device must read a peripheral device mailbox packet pointer to get a starting address of said packet.

18. The apparatus of claim 1, wherein said prefetch buffer consists of two banks of buffers that are designated as bank 0 and bank 1, respectively.

19. The apparatus of claim 18, wherein each byte of a buffer contains a flag that indicates if a data byte is valid.

20. The apparatus of claim 18, wherein a first byte of bank 0 contains data for a word aligned peripheral address (PAR0+0), a second byte of bank 0 contains data for the word aligned peripheral address plus one (PAR0+1), a third byte of bank 0 contains data for the word aligned peripheral address plus two (PAR0+2), and a fourth byte of bank 0 contains data for the word aligned peripheral address plus three (PAR0+3).

21. The apparatus of claim 18, wherein a first byte of bank 1 contains data for a a word aligned peripheral address (PAR1+0), a second byte of bank 1 contains data for the word aligned peripheral address plus one (PAR1+1), a third byte of bank 1 contains data for the word aligned peripheral address plus two (PAR1+2), and a fourth byte of bank 1 contains data for the word aligned peripheral address plus three (PAR1+3).

22. The apparatus of claim 1, said prefetch address fence register further comprising a programmable register that represents a shared memory address plus a predetermined number N at which a prefetch operation begins, whereby any peripheral device read request having a shared memory address greater than that of said prefetch address fence register is prefetched.

23. The apparatus of claim 1, wherein said prefetch address fence register is used by said access state machine to disable a prefetch operation.

24. The apparatus of claim 1, wherein said data transfer protocol is an MIO protocol.

25. The method for reducing shared memory contention at an interface between a peripheral device and a computer network, wherein the interface implements a data transfer protocol such that packet data is linearly transmitted via said interface to said shared memory, and the control mechanism for said packet resides in a predefined location in a shared memory, comprising the steps of:

storing data in a shared memory; and prefetching next requested data in said shared memory, wherein said prefetch operation reduces the possibility of shared memory contention and reduces memory access time for a peripheral device read operation on said shared memory, wherein said prefetching step is performed with a prefetch module comprising:

an access state machine for processing peripheral device shared memory requests;

at least one prefetch address register;

at least one prefetch buffer with at least one valid flag; and a prefetch fence register.

26. The method of claim 25, further comprising the step of:

accessing shared memory in any of a byte write, byte read, and long word read mode.

27. The method of claim 25, further comprising the steps of:

requesting a single byte write to said shared memory from shared memory arbitrator with said access state machine; and asserting an acknowledge with said access state machine if said shared memory request is a write request.

28. The method of claim 25, further comprising the step of:

requesting a single byte read from said shared memory arbitrator with said access state machine if said shared memory request is a read operation, and a requested shared memory address is below a prefetch address fence register.

29. The method of claim 25, further comprising the step of:

requesting a single long word read from said shared memory arbitrator with said access state machine if the requested shared memory address is above a prefetch address fence register and said memory address, word aligned, does not match either a prefetch address register 0 (PAR0) or a prefetch address register 1 (PAR1).

30. The method of claim 25, further comprising the step of:

storing each byte of data in a bank 0 or bank 1 prefetch buffer as it is read from said shared memory during a single long word read request.

31. The method of claim 25, further comprising the step of:

validating said prefetch buffer with said access state machine as each byte of data read from said shared memory is stored in said prefetch buffer.

32. The method of claim 25, further comprising the step of:

asserting an acknowledge with said access state machine when peripheral request data is available from a valid prefetch buffer.

33. The method of claim 25, further comprising the step of:

requesting a single long word read from said shared memory arbitrator with said access state machine if a peripheral device read request is read from a third byte of either bank 0 or bank 1 of said prefetch buffer, wherein said access state machine invalidates a bank of said prefetch buffers that does not contain peripheral request data.

34. The method of claim 25, further comprising the step of:

generating a starting address with said access state machine equal to a current peripheral address plus a next word aligned peripheral address for a single long word read request to said shared memory arbitrator.

35. The method of claim 25, further comprising the step of:

validating said prefetch buffer as each byte of data is read from said shared memory.

36. The method of claim 25, further comprising the step of:

protecting a peripheral device from reading stale data from an I/O mailbox by use of said prefetch fence register.

37. The method of claim 25, further comprising the steps of:

writing data directly to said shared memory; and invalidating a bank of said prefetch buffer if a word aligned peripheral address matches either prefetch address register PAR0 or PAR1 during a peripheral device write request.

38. The method of claim 25, further comprising the step of:

invalidating both banks of said prefetch buffer when a peripheral device reads a least significant byte of a peripheral device mailbox packet pointer, wherein said peripheral device is protected from reading incorrect packet header data.

39. The method of claim 25, further comprising the step of:

reading a peripheral device mailbox packet pointer to get a starting address of said packet.

40. The method of claim 25, wherein said prefetch address register consists of prefetch address registers PAR0 and PAR1; and wherein said access state machine writes to said prefetch address registers PAR0 or PAR1 with a truncated word read request address during a prefetch operation.

41. The method of claim 25, wherein said prefetch buffer consists of two banks of buffers that are designated as bank 0 and blank 1, respectively.

42. The method of claim 25, wherein said prefetch address fence register further comprises a programmable register that represents a shared memory address plus a predetermined number N at which a prefetch operation begins, whereby any peripheral device read request having a shared memory address greater than that of said prefetch address fence register is prefetched.

43. The method of claim 25, wherein said prefetch address fence register is used by said access state machine to disable a prefetch operation.

44. A method for reducing shared memory contention at an interface implementing a MIO data transfer protocol between a peripheral device and an I/O card device, comprising the steps of:

storing data linearly in a shared memory;

storing a shared memory address plus a predetermined number N at which a prefetch operation begins in a programmable register; and prefetching next requested data in said shared memory for any peripheral device read request having a shared memory address greater than that of said programmable register, wherein said prefetching step is performed with a prefetch module comprising:

an access state machine for processing peripheral device shared memory requests;

at least one prefetch address register;

at least one prefetch buffer with at least one valid flag; and a prefetch fence register.

* * * * *

UNITED STATES PATENT AND TRADEMARK OFFICE
CERTIFICATE OF CORRECTION

PATENT NO.    : 5,829,042
DATED         : October 27, 1998
INVENTOR(S)   : Leung It is certified that error appears in the above-identified patent and that said Letters Patent is hereby corrected as shown below:

Column 5,
Line 34, delete "(Le." and insert therefor -- (i.e. --

Column 6,
Line 51, delete "below" and insert therefor -- below. --

Column 8,
Line 38, delete "0.561T" and insert therefor -- 0.56T --

Column 10,
Line 39, before "method" delete "The" and insert therefor -- A --
Line 21, before "word" delete "a"

Signed and Sealed this

Fifteenth Day of April, 2003

JAMES E. ROGAN
*Director of the United States Patent and Trademark Office*